US012603908B2

(12) United States Patent
Sundar et al.

(10) Patent No.: US 12,603,908 B2
(45) Date of Patent: Apr. 14, 2026

(54) SYSTEM FOR DETECTING ANOMALOUS NETWORK PATTERNS BASED ON ANALYZING NETWORK TRAFFIC DATA AND METHOD THEREOF

(71) Applicant: Privafy Inc, Burlington, MA (US)

(72) Inventors: Rangamani Sundar, Burlington, MA (US); Xuepeng Sun, Burlington, MA (US); Gurudutt Pai, Burlington, MA (US); Kumar Vishwanathan, Burlington, MA (US); Vijay Sankar Veeriah, Bangalore (IN); Srinivasan Krishnamoorthy, Bangalore (IN)

(73) Assignee: Privafy Inc

( * ) Notice: Subject to any disclaimer, the term of this patent is extended or adjusted under 35 U.S.C. 154(b) by 38 days.

(21) Appl. No.: 18/748,377

(22) Filed: Jun. 20, 2024

(65) Prior Publication Data

US 2025/0023894 A1     Jan. 16, 2025

Related U.S. Application Data

(60) Provisional application No. 63/513,395, filed on Jul. 13, 2023.

(51) Int. Cl.
*H04L 9/40* (2022.01)
*H04L 43/045* (2022.01)

(52) U.S. Cl.
CPC ........ *H04L 63/1425* (2013.01); *H04L 43/045* (2013.01); *H04L 63/1416* (2013.01)

(58) Field of Classification Search
CPC . H04L 63/1425; H04L 63/1416; H04L 41/16; H04L 43/026
See application file for complete search history.

(56) References Cited

U.S. PATENT DOCUMENTS

| | | | | |
|---|---|---|---|---|
| 12,057,993 | B1 * | 8/2024 | Zafer | ................. H04L 41/0654 |
| 2015/0341376 | A1 * | 11/2015 | Nandy | ................ H04L 63/1416 |
| | | | | 726/23 |
| 2019/0188065 | A1 | 6/2019 | Anghel et al. | |
| 2020/0374306 | A1 | 11/2020 | Dai | |
| 2021/0288986 | A1 | 9/2021 | Myers et al. | |
| 2023/0135485 | A1 | 5/2023 | Sesha et al. | |
| 2023/0246935 | A1 | 8/2023 | Tian et al. | |
| 2023/0401591 | A1 * | 12/2023 | Janani | ................ G06Q 30/0201 |

FOREIGN PATENT DOCUMENTS

WO        2022243980 A1     11/2022

* cited by examiner

*Primary Examiner* — Anh Nguyen
(74) *Attorney, Agent, or Firm* — Jason C. Cameron

(57) ABSTRACT

A system for detecting anomalous network patterns based on analyzing network traffic data and method thereof are disclosed. The system comprises a flow aggregator subsystem, a flow feature generation subsystem, an anomaly detection subsystem, a dynamic score subsystem, and a calibration subsystem. The system is configured to receive the network traffic data from one or more network endpoints for aggregating the network traffic data into network flow data. The system is configured to generate one or more flow features for each packet associated with the aggregated network traffic data based on a rolling window-based analysis of the one or more attributes. The system is configured to analyze the one or more flow features by utilizing one or more deep-learning models to detect the one or more anomalous network patterns.

18 Claims, 7 Drawing Sheets

100

SYSTEM 102

SERVER(S) 110

HARDWARE PROCESSOR(s) 110a

MEMORY UNIT 112

SUBSYSTEM(S) 114

COMMUNICATION NETWORK 108

DATABASE 104

Elasticsearch database 104a

NETWORK ENDPOINT(S) 116

COMMUNICATION DEVICE(S) 106

Data visualization dashboard 118

200

400

Aggregate, by one or more servers, the network traffic data received from one or more network endpoints into network flow data 402

Generate, by the one or more servers, one or more flow features for each packet associated with the aggregated network traffic data based on a rolling window-based analysis of the one or more attributes 404

Analyze, by the one or more servers, the one or more flow features by utilizing one or more deep-learning models to detect the one or more anomalous network patterns of one or more anomalies in the network traffic data to assign a first-stage numerical score to the one or more anomalies 406

Convert, by the one or more servers, the first-stage numerical score into a second-stage numerical score within a pre-defined range using time-series methods based on a dynamically altered threshold score using a cumulative distribution of the first-stage numerical score to detect the one or more anomalous network patterns derived from the analysis of network traffic data 408

SYSTEM FOR DETECTING ANOMALOUS NETWORK PATTERNS BASED ON ANALYZING NETWORK TRAFFIC DATA AND METHOD THEREOF

EARLIEST PRIORITY DATE

This application claims priority from a Provisional patent application filed in the United States of America having Patent Application No. 63/513,395, filed on Jul. 13, 2023, and titled "SYSTEM AND METHOD FOR NETWORK TRAFFIC OUTLIER DETECTION".

TECHNICAL FIELD

Embodiments of the present disclosure relate to network traffic data analysis, and more particularly relate to a computer-implemented system for detecting one or more anomalous network patterns based on analyzing network traffic data.

BACKGROUND

Computer networks, including the internet, facilitate the transfer of network traffic data between computers using diverse communication media such as electrical and fiber optic cables. These networks are interconnected by various switches or routers. Standard data transmission protocols like Transmission Control Protocol (TCP/Internet Protocol (IP) divide the data into separate packets that are individually routed and reassembled at the intended destination. The data originated from any source and is converted into a digital format, encompassing text, video, and audio content.

In the recent past, the internet experienced unlimited expansion, becoming an essential tool for various types of business and personal communication. Networked systems became crucial in swiftly accessing information, collaborating with partners, and engaging in electronic commerce. Nevertheless, as with any technological progress, challenges arise. Despite the transformative impact of computer networks on business operations, they also bring significant risks. Network attacks result in financial losses, wasted time, damaged reputation, and compromised confidential data.

Firewalls serve the purpose of restricting access between networks. They are commonly designed to filter network traffic by considering attributes such as source and destination addresses, port numbers, and transport layer protocols. However, firewalls are vulnerable to maliciously crafted traffic that aims to bypass the predefined blocking rules. Furthermore, most commercially available intrusion detection systems (IDS) rely either on signature-based detection or anomaly-based systems.

In the recent past, the network traffic data volume has exponentially increased, posing significant challenges for network administrators and security analysts. Traditional methods of analyzing the network traffic data often struggle to keep pace with the sheer volume and complexity of data generated by modern networks. Existing technologies for the network traffic data analysis typically rely on static thresholds or rule-based systems to detect one or more anomalies or one or more suspicious activities. While these methods are effective to some extent, they often suffer from several drawbacks.

Firstly, the static threshold-based approaches fail to adapt to dynamic changes in network behavior, leading to a high rate of false positives or negatives. As one or more network traffic patterns evolve over time, these static thresholds become obsolete or ineffective in accurately identifying the one or more anomalies. Secondly, the rule-based systems often require an extensive manual configuration and maintenance, making them cumbersome to manage and prone to human error. Additionally, these existing technologies struggle to detect previously unseen or emerging threats that do not conform to predefined rules or patterns. Furthermore, traditional approaches to the network traffic data analysis lack the scalability and efficiency needed to process large volumes of data in real-time. As network traffic continues to grow in size and complexity.

In the existing technology, a system for outlier exposure-based anomaly detection for detecting anomalies in network traffic is disclosed. According to one or more embodiments, a central node is configured to train an Outlier Exposure (OE)-based autoencoder using unlabeled network data and labeled network attack data where the OE-based autoencoder is trained to reconstruct input data with an objective that is configured to minimize a reconstruction error on unlabeled network data and to maximize the reconstruction error on labeled network attack data, use the trained OE-based autoencoder to determine a reconstruction error on network traffic, and compare the determined reconstruction error to a threshold to determine if local network traffic is an anomaly. However, the existing system lacks in analyzing the network traffic patterns to detect potential security breaches, network intrusions, or suspicious activities to take proactive security measures. Moreover, the existing system does not disclose a raw flow feature that includes numerical features that represent quantitative measurements or values associated with the network flow and categorical features that represent qualitative attributes associated with the network flow data.

There are various technical problems with the network traffic data analysis in the prior art. In the existing technology, the traditional methods often struggle to keep pace with the rapidly evolving landscape of network threats and anomalies. The static threshold-based approaches, commonly used for anomaly detection, lack adaptability to changing network conditions, leading to a high rate of false positives and negatives. Additionally, the rule-based systems require extensive manual configuration and maintenance, making them impractical for large-scale network deployments. Moreover, the sheer volume and complexity of network traffic data pose significant challenges for traditional analysis techniques, often resulting in performance bottlenecks and limited scalability. As a result, there is a critical need for more advanced and adaptive solutions that can effectively analyze and secure network traffic in real-time, while also addressing the limitations of existing technologies.

Therefore, there is a need for a system to address and overcome the aforementioned issues and provide an advanced and adaptive solution for detecting one or more anomalous network patterns based on analyzing the network traffic data.

SUMMARY

This summary is provided to introduce a selection of concepts, in a simple manner, which is further described in the detailed description of the disclosure. This summary is neither intended to identify key or essential inventive concepts of the subject matter nor to determine the scope of the disclosure.

In accordance with an embodiment of the present disclosure, a computer-implemented system for detecting one or more anomalous network patterns based on analyzing network traffic data is disclosed. The computer-implemented system comprises one or more servers and a memory unit. The one or more servers is configured with one or more hardware processors. The memory unit is coupled to the one or more servers, wherein the memory unit comprises a set of program instructions in form of a plurality of subsystems. The plurality of subsystems is configured to be executed by the one or more servers. The plurality of subsystems comprises a flow aggregator subsystem, a flow feature generation subsystem, an anomaly detection subsystem, a dynamic score subsystem, and a calibration subsystem.

In an embodiment, the flow aggregator subsystem is configured to receive the network traffic data from one or more network endpoints for aggregating the network traffic data into network flow data. The network flow data is configured with one or more attributes. The network traffic data comprises at least one of: layer-3 packets, layer-4 Transmission Control Protocol (TCP) flows, layer-4 User Datagram Protocol (UDP) flows, and layer-7 application-level payloads. The one or more attributes comprises at least one of: source Internet Protocol (IP) addresses, destination Internet Protocol (IP) addresses, destination ports, transfer protocols, flow bytes, flow packets, and timestamps.

In another embodiment, the flow feature generation subsystem is configured to generate one or more flow features for each packet associated with the aggregated network traffic data based on a rolling window-based analysis of the one or more attributes. The one or more flow features comprises at least one of: source duration, source bytes, source packets, destination duration, destination bytes, and destination packets. The flow feature generation subsystem is configured with time-series methods. The time-series methods are configured to compute smoothed estimates of averages and variances for the one or more flow features over pre-defined time windows. The time-series methods comprise at least one of a: exponential-weighted smoothing, and on-line cumulative distribution updating.

In yet another embodiment, the anomaly detection subsystem is configured to analyze the one or more flow features by utilizing one or more deep-learning models to detect the one or more anomalous network patterns of one or more anomalies in the network traffic data thereby assigning a first-stage numerical score to the one or more anomalies. The anomaly detection subsystem is configured with an embedding layer. The embedding layer is configured to segregate numerical state variables and categorical flow labels associated with the one or more flow features. The one or more deep-learning models is configured with Leaky Rectified Linear Unit (leaky-ReLU). The leaky-ReLU is configured to perform at least one of an: encoding and decoding of the one or more flow features, to provide an optimal characteristic between at least one of: diverse traffic types, the numerical state variables, and the categorical flow labels to detect the one or more anomalous network patterns. The anomalies detection subsystem is configured to utilize simulated traffic data in combination with real-time network traffic data, for offline training the one or more deep-learning models. The one or more deep-learning models is a multi-layer autoencoder neural network.

In an embodiment, the dynamic score subsystem is configured to convert the first-stage numerical score into a second-stage numerical score within a pre-defined range using time-series methods based on a dynamically altered threshold score using a cumulative distribution of the first-stage numerical score to detect the one or more anomalous network patterns derived from the analysis of network traffic data. The pre-defined range for the second-stage numerical score generated by the dynamic score subsystem is configured between 0 and 100. The dynamic score subsystem is configured to update the pre-defined range of the second-stage numerical score based on the first-stage numerical score and a frequency of detection of the one or more anomalies. The dynamic score subsystem is configured with an alert-generating module. The alert-generating module is configured to generate an outlier alert if the second-stage numerical score exceeds the dynamically altered threshold score, indicating a presence of the one or more anomalous network patterns.

In another embodiment, the calibration subsystem is configured to continuously monitor and update one or more system parameters based on one or more systemwide average metrics. The one or more system parameters comprises at least one of: the dynamically altered threshold score, weights, and biases of the one or more deep-learning models, and window sizes for the time-series methods. The one or more systemwide average metrics comprises at least one of: the source Internet Protocol (IP) addresses, the destination Internet Protocol (IP) addresses, total bytes, packets, flows, average network latency, throughput, and error rates.

In yet another embodiment, the second-stage numerical score and the one or more flow features are configured to store in an elasticsearch database. The elasticsearch database is configured with a data visualization dashboard to provide various visualization tools, including at least one of: histograms, line charts, pie charts, and heatmaps, to visualize the second-stage numerical score and the one or more flow features.

In accordance with an embodiment of the present disclosure, a computer-implemented method for detecting the one or more anomalous network patterns based on analyzing the network traffic data. In the first step, the computer-implemented method includes aggregating, by the one or more servers, the network traffic data received from the one or more network endpoints into the network flow data. The network flow data is configured with the one or more attributes. In the next step, the computer-implemented method includes generating, by the one or more servers, the one or more flow features for each packet associated with the aggregated network traffic data based on the rolling window-based analysis of the one or more attributes. In the next step, the computer-implemented method includes analyzing, by the one or more servers, the one or more flow features by utilizing the one or more deep-learning models to detect the one or more anomalous network patterns of the one or more anomalies in the network traffic data to assign the first-stage numerical score to the one or more anomalies. In the next step, the computer-implemented method includes converting, by the one or more servers, the first-stage numerical score into the second-stage numerical score within the pre-defined range using the time-series methods based on the dynamically altered threshold score using the cumulative distribution of the first-stage numerical score to detect the one or more anomalous network patterns derived from the analysis of network traffic data.

In the next step, the computer-implemented method includes generating, by the one or more servers, the outlier alert if the second-stage numerical score exceeds the dynamically altered threshold score, indicating the presence of the one or more anomalous network patterns. In the next step, the computer-implemented method includes visualizing, by the one or more servers, through the data visualization dashboard the second-stage numerical score, and the one or more flow features stored in the elasticsearch database. Further, in the next step, the computer-implemented method includes updating, by the one or more servers, the one or more system parameters based on the one or more systemwide average metrics.

In accordance with an embodiment of the present disclosure, a non-transitory computer-readable storage medium having programmable instructions stored therein, that when executed by one or more servers, causes the one or more servers to a) aggregating the network traffic data received from the one or more network endpoints into the network flow data. The network flow data configured with the one or more attributes, b) generating the one or more flow features for each packet associated with the aggregated network traffic data based on the rolling window-based analysis of the one or more attributes, c) analyzing the one or more flow features by utilizing the one or more deep-learning models to detect the one or more anomalous network patterns of the one or more anomalies in the network traffic data to assign the first-stage numerical score to the one or more anomalies, d) converting the first-stage numerical score into the second-stage numerical score within the pre-defined range using the time-series methods based on the dynamically altered threshold score using the cumulative distribution of the first-stage numerical score to detect the one or more anomalous network patterns derived from the analysis of network traffic data.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF DRAWINGS

The disclosure will be described and explained with additional specificity and detail with the accompanying figures in which:

FIG. 4 illustrates an exemplary flow chart of a computer-implemented method for detecting the one or more anomalous network patterns based on analyzing the network traffic data, in accordance with an embodiment of the present disclosure.

Figure 1:
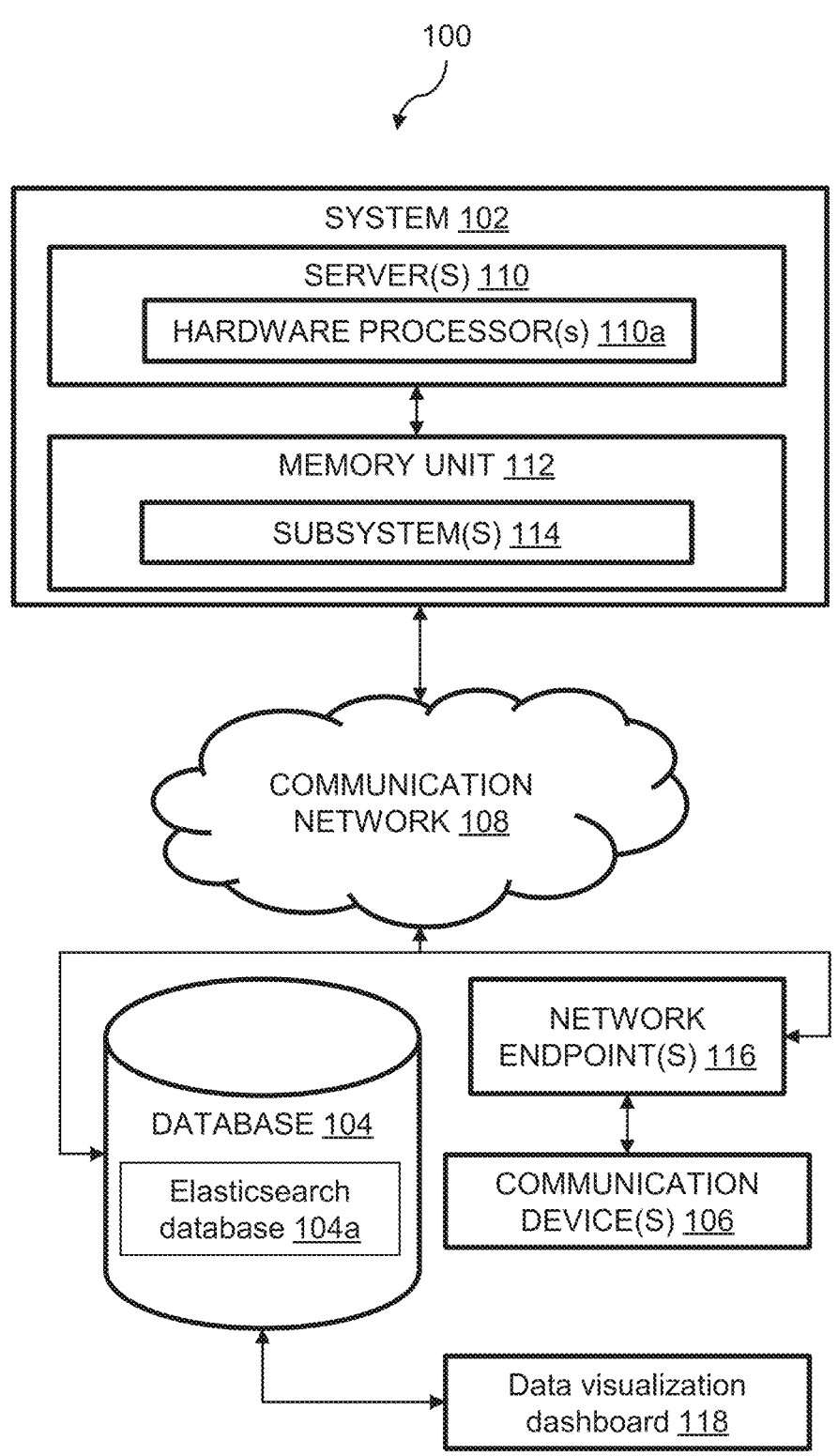
FIG. 1 illustrates an exemplary block diagram representation of a network architecture depicting a computer-implemented system for detecting one or more anomalous network patterns based on analyzing network traffic data, in accordance with an embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION OF THE DISCLOSURE

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure. It will be understood by those skilled in the art that the foregoing general description and the following detailed description are exemplary and explanatory of the disclosure and are not intended to be restrictive thereof.

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

The terms "comprise", "comprising", or any other variations thereof, are intended to cover a non-exclusive inclusion, such that one or more devices or subsystems or elements or structures or components preceded by "comprises . . . a" does not, without more constraints, preclude the existence of other devices, subsystems, additional sub-modules. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

A computer system (standalone, client or server computer system) configured by an application may constitute a "module" (or "subsystem") that is configured and operated to perform certain operations. In one embodiment, the "module" or "subsystem" may be implemented mechanically or electronically, so a module include dedicated circuitry or logic that is permanently configured (within a special-purpose processor) to perform certain operations. In another embodiment, a "module" or "subsystem" may also comprise programmable logic or circuitry (as encompassed within a general-purpose processor or other programmable processor) that is temporarily configured by software to perform certain operations.

Accordingly, the term "module" or "subsystem" should be understood to encompass a tangible entity, be that an entity that is physically constructed permanently configured (hardwired) or temporarily configured (programmed) to operate in a certain manner and/or to perform certain operations described herein.

Referring now to the drawings, and more particularly to FIG. 1 through FIG. 5, where similar reference characters denote corresponding features consistently throughout the figures, there are shown preferred embodiments and these embodiments are described in the context of the following exemplary system and/or method.

FIG. 1 illustrates an exemplary block diagram representation of a network architecture 100 depicting a computer-implemented system 102 for detecting one or more anomalous network patterns based on analyzing network traffic data, in accordance with an embodiment of the present disclosure. According to FIG. 1, the network architecture 100 may include the computer-implemented system 102, a database 104, and one or more communication devices 106. The computer-implemented system 102 may be communicatively coupled to the database 104, and the one or more communication devices 106 via a communication network 108. The communication network 108 may be a wired communication network and/or a wireless communication network. The database 104 may include, but not limited to, storing, and managing data related to network traffic, historical patterns, and identified one or more anomalies. The one or more communication devices 106 may represent various network endpoints, such as, but not limited to, routers, switches, servers, user devices, mobile devices, smartphones, Personal Digital Assistants (PDAs), tablet computers, phablet computers, wearable computing devices, Virtual Reality/Augmented Reality (VR/AR) devices, laptops, desktops, and the like, which generate and transmit the network traffic data. The database 104 may be any kind of database such as, but not limited to, relational databases, non-relational databases, graph databases, document databases, dedicated databases, dynamic databases, monetized databases, scalable databases, cloud databases, distributed databases, any other databases, and a combination thereof. The computer-implemented system 102 is configured to analyze the incoming network traffic data in real-time, leveraging advanced machine learning algorithms and data-driven techniques to detect anomalous patterns indicative of potential security threats or performance issues. By continuously monitoring and analyzing network traffic data, the computer-implemented system 102 can identify and respond to anomalies promptly, thereby enhancing network security and reliability. The database 104 is configured to support the functionality of the computer-implemented system 102 and enables efficient data retrieval and storage for various aspects of the one or more anomalous network patterns detection.

In an exemplary embodiment, the one or more communication devices 106 may be associated with, but not limited to, one or more service providers, one or more customers, an individual, an administrator, a vendor, a technician, a worker, a specialist, an instructor, a supervisor, a team, an entity, an organization, a company, a facility, a bot, any other user, and combination thereof. The entities, the organization, and the facility may include, but not limited to, an e-commerce company, online marketplaces, service providers, retail stores, a merchant organization, a logistics company, warehouses, transportation company, an airline company, a hotel booking company, a hospital, a healthcare facility, an exercise facility, a laboratory facility, a company, an outlet, a manufacturing unit, an enterprise, an organization, an educational institution, a secured facility, a warehouse facility, a supply chain facility, any other facility/organization and the like.

Further, the computer-implemented system 102 may be implemented by way of a single device or a combination of multiple devices that may be operatively connected or networked together. The computer-implemented system 102 may be implemented in hardware or a suitable combination of hardware and software. The computer-implemented system 102 includes one or more servers 110. The one or more servers 110 is configured with one or more hardware processors 110a, and a memory unit 112. The memory unit 112 may include a plurality of subsystems 114. The computer-implemented system 102 may be the one or more servers 110 including the one or more hardware processors 110a executing machine-readable program instructions for dynamically recommending the course of action sequences for detecting the one or more anomalous network patterns based on analyzing the network traffic data. Execution of the machine-readable program instructions by the one or more servers 110 may enable the computer-implemented system 102 to dynamically recommend the course of action sequence. The course of action sequences may involve various steps or decisions taken within the computer-implemented system 102 to optimize the response to detect the one or more anomalous network patterns. These steps or decisions may include adjusting network configurations, deploying additional security measures, rerouting traffic, isolating affected devices or segments, alerting network administrators, and initiating automated responses, among others. By leveraging real-time analysis of the network traffic data and sophisticated algorithms, the computer-implemented system 102 may intelligently recommend appropriate actions to mitigate risks, enhance network performance, and ensure the overall integrity and security of a network infrastructure.

The "one or more servers 110" may comprise a combination of discrete components, an integrated circuit, an application-specific integrated circuit, a field-programmable gate array, a digital signal processor, or other suitable hardware. The "software" may comprise one or more objects, agents, threads, lines of code, subroutines, separate software applications, two or more lines of code, or other suitable software structures operating in one or more software applications or on one or more processors.

The one or more hardware processors 110a may include, for example, microprocessors, microcomputers, microcontrollers, digital signal processors, central processing units, state machines, logic circuits, and/or any devices that manipulate data or signals based on operational instructions. Among other capabilities, the one or more hardware processors 110a may fetch and execute computer-readable instructions in the memory unit 112 operationally coupled with the computer-implemented system 102 for performing tasks such as data processing, input/output processing, and/or any other functions. Any reference to a task in the present disclosure may refer to an operation being or that may be performed on data.

Though few components and the plurality of subsystems 114 are disclosed in FIG. 1, there may be additional components and subsystems which is not shown, such as, but not limited to, ports, routers, repeaters, firewall devices, network devices, databases 104, network attached storage devices, assets, machinery, instruments, facility equipment, emergency management devices, image capturing devices, any other devices, and combination thereof. The person skilled in the art should not be limiting the components/subsystems shown in FIG. 1. Although FIG. 1 illustrates the computer-implemented system 102, and the one or more communication devices 106 connected to the database 104, one skilled in the art can envision that the computer-implemented system 102, and the one or more communication devices 106 may be connected to several user devices located at various locations and several databases via the communication network 108.

Those of ordinary skilled in the art will appreciate that the hardware depicted in FIG. 1 may vary for particular implementations. For example, other peripheral devices such as an optical disk drive and the like, local area network (LAN), wide area network (WAN), wireless (e.g., wireless-fidelity (Wi-Fi)) adapter, graphics adapter, disk controller, input/output (I/O) adapter also may be used in addition or place of the hardware depicted. The depicted example is provided for explanation only and is not meant to imply architectural limitations concerning the present disclosure.

Those skilled in the art will recognize that, for simplicity and clarity, the full structure and operation of all data processing systems suitable for use with the present disclosure are not being depicted or described herein. Instead, only so much of the computer-implemented system 102 as is unique to the present disclosure or necessary for an understanding of the present disclosure is depicted and described. The remainder of the construction and operation of the computer-implemented system 102 may conform to any of the various current implementations and practices that were known in the art.

In an exemplary embodiment, the computer-implemented system 102 may receive the network traffic data from the one or more network endpoints for aggregating the network traffic data into network flow data. The network flow data is configured with one or more attributes In an exemplary embodiment, the computer-implemented system 102 may generate one or more flow features for each packet associated with the aggregated network traffic data based on a rolling window-based analysis of the one or more attributes.

In an exemplary embodiment, the computer-implemented system 102 may analyze the one or more flow features by utilizing one or more deep-learning models to detect the one or more anomalous network patterns of the one or more anomalies in the network traffic data thereby assigning a first-stage numerical score to the one or more anomalies.

In an exemplary embodiment, the computer-implemented system 102 may convert the first-stage numerical score into a second-stage numerical score within a pre-defined range using time-series methods based on a dynamically altered threshold score using a cumulative distribution of the first-stage numerical score to detect the one or more anomalous network patterns derived from the analysis of the network traffic data.

In an exemplary embodiment, the computer-implemented system 102 may continuously monitor and update one or more system parameters based on one or more systemwide average metrics. The one or more system parameters comprises at least one of: the dynamically altered threshold score, weights, and biases of the one or more deep-learning models, and window sizes for the time-series methods. The one or more systemwide average metrics comprises at least one of: the source Internet Protocol (IP) addresses, the destination Internet Protocol (IP) addresses, total bytes, packets, flows, average network latency, throughput, and error rates.

Figure 2A:
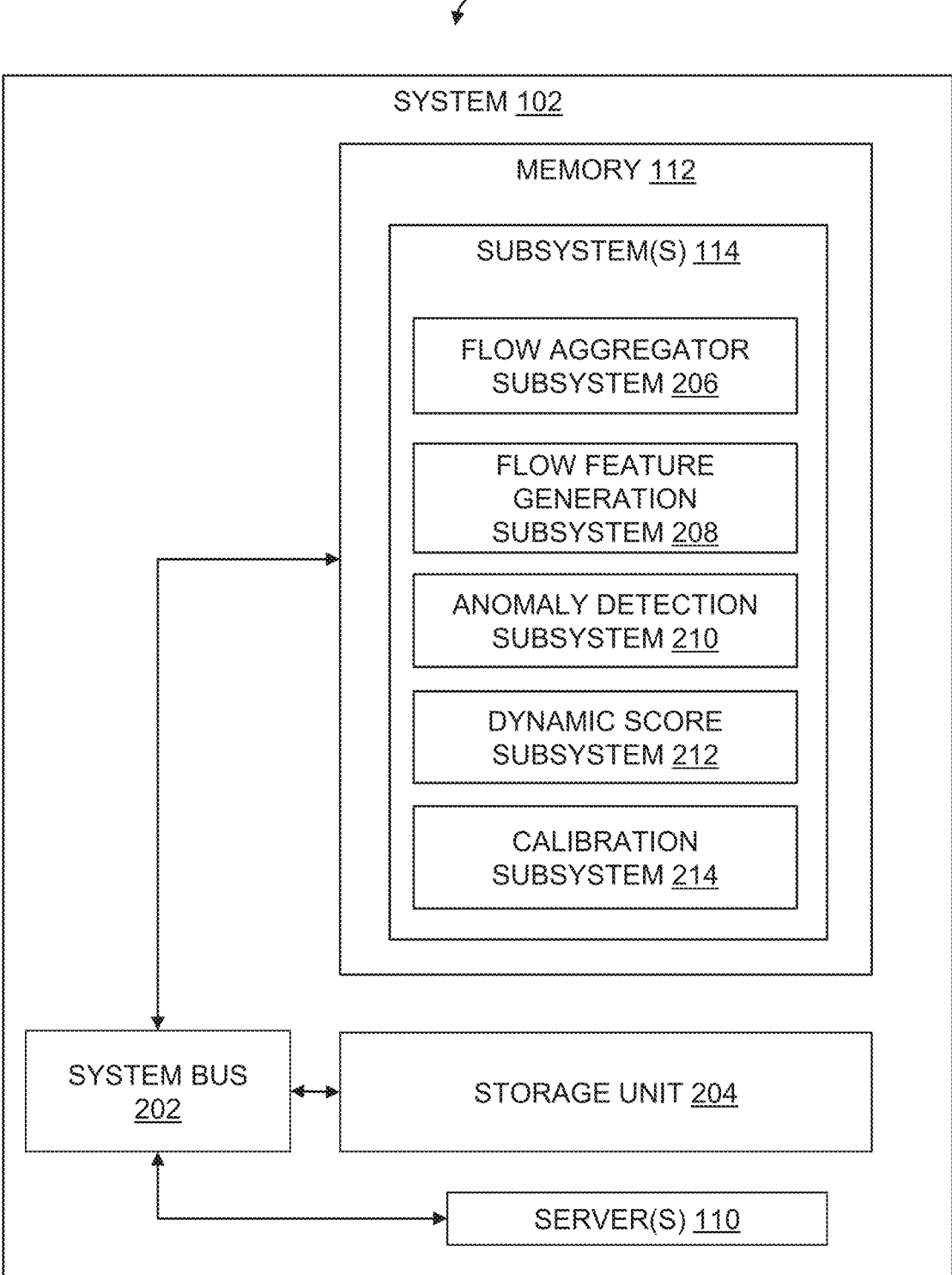
FIG. 2A illustrates an exemplary block diagram representation of the computer-implemented system as shown in FIG. 1 for detecting the one or more anomalous network patterns based on analyzing the network traffic data, in accordance with an embodiment of the present disclosure.

FIG. 2A illustrates an exemplary block diagram 200 representation of the computer-implemented system 102 as shown in FIG. 1 for detecting the one or more anomalous network patterns based on analyzing the network traffic data, in accordance with an embodiment of the present disclosure.

Figure 2B:
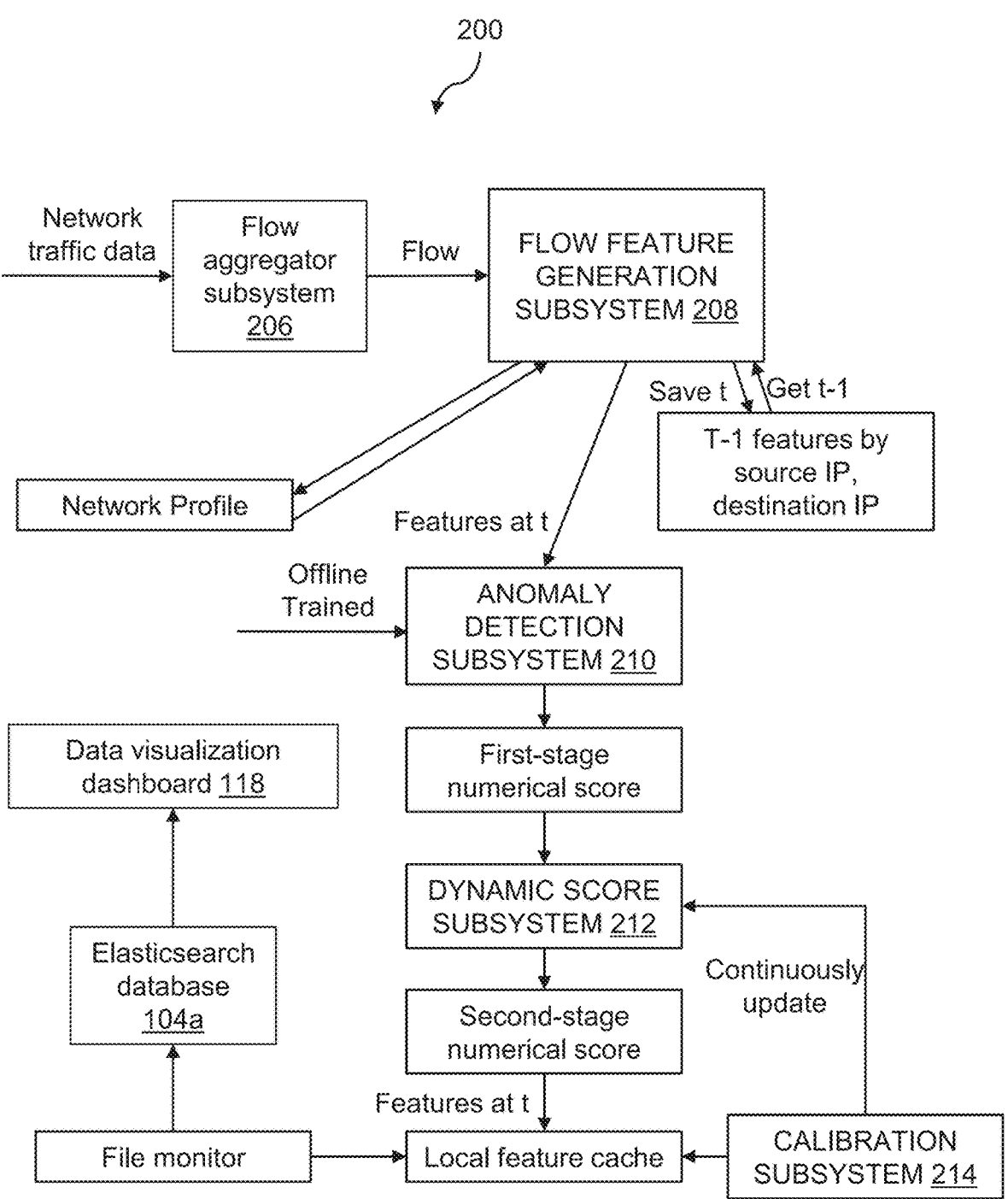
FIG. 2B illustrates an exemplary block diagram representation of the computer-implemented system as shown in FIG. 1 for detecting the one or more anomalous network patterns based on analyzing the network traffic data, in accordance with an embodiment of the present disclosure.

FIG. 2B illustrates an exemplary block diagram 200 representation of the computer-implemented system 102 as shown in FIG. 1 for detecting the one or more anomalous network patterns based on analyzing the network traffic data, in accordance with an embodiment of the present disclosure.

Figure 2C:
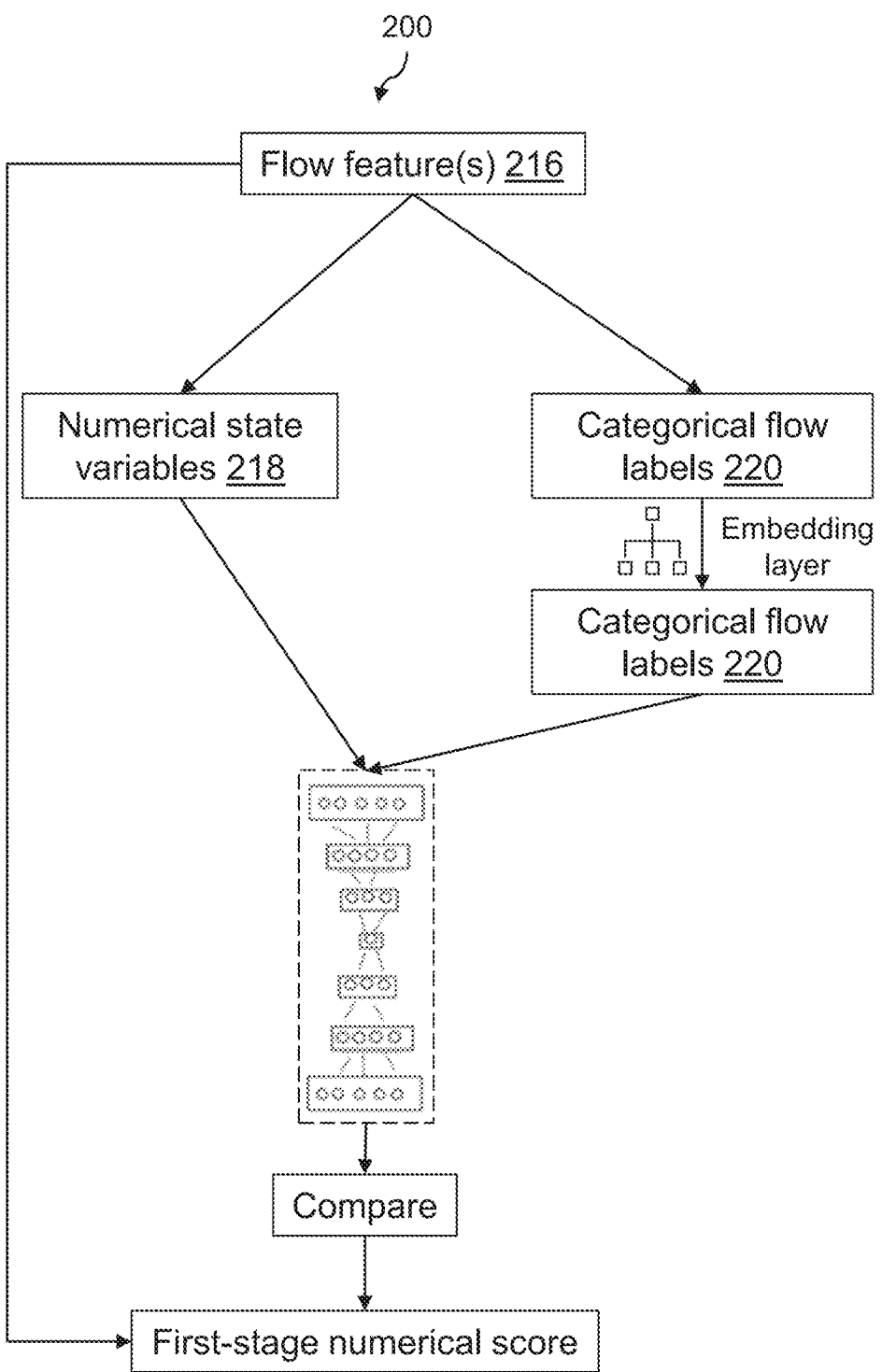
FIG. 2C illustrates an exemplary block diagram of the anomaly detection subsystem for generating a first-stage numerical score in the computer-implemented system, in accordance with an embodiment of the present disclosure.

FIG. 2C illustrates an exemplary block diagram 200 of the anomaly detection subsystem 210 for generating the first-stage numerical score in the computer-implemented system 102, in accordance with an embodiment of the present disclosure.

In an exemplary embodiment, the computer-implemented system 102 (hereinafter referred to as the system 102). The system 102 comprises the one or more servers 110, the memory unit 112, and a storage unit 204. The one or more servers 110, the memory unit 112, and the storage unit 204 are communicatively coupled through a system bus 202 or any similar mechanism. The memory unit 112 is operatively connected to the one or more servers 110. The memory unit 112 comprises the plurality of subsystems 114 in form of programmable instructions executable by the one or more servers 110.

The plurality of subsystems 114 comprises a flow aggregator module 206, a flow feature generation subsystem 208, an anomaly detection subsystem 210, a dynamic score subsystem 212, and a calibration subsystem 214. The one or more hardware processors 110a associated within the one or more servers 110, as used herein, means any type of computational circuit, such as, but not limited to, a microprocessor unit, microcontroller, complex instruction set computing microprocessor unit, reduced instruction set computing microprocessor unit, very long instruction word microprocessor unit, explicitly parallel instruction computing microprocessor unit, graphics processing unit, digital signal processing unit, or any other type of processing circuit. The one or more hardware processors 110a may also include embedded controllers, such as generic or programmable logic devices or arrays, application-specific integrated circuits, single-chip computers, and the like.

The memory unit 112 may be a non-transitory volatile memory and a non-volatile memory. The memory unit 112 may be coupled to communicate with the one or more servers 110, such as being a computer-readable storage medium. The one or more servers 110 may execute machine-readable instructions and/or source code stored in the memory unit 112. A variety of machine-readable instructions may be stored in and accessed from the memory unit 112. The memory unit 112 may include any suitable elements for storing data and machine-readable instructions, such as read-only memory, random access memory, erasable programmable read-only memory, electrically erasable programmable read-only memory, a hard drive, a removable media drive for handling compact disks, digital video disks, diskettes, magnetic tape cartridges, memory cards, and the like. In the present embodiment, the memory unit 112 includes the plurality of subsystems 114 stored in the form of machine-readable instructions on any of the above-mentioned storage media and may be in communication with and executed by the one or more servers 110.

The storage unit 204 may be a cloud storage or the database 104 such as those shown in FIG. 1. The storage unit 204 may store, but not limited to, recommended course of action sequences dynamically generated by the system 102. These action sequences are based on real-time network traffic data analysis and machine learning algorithms' application. Additionally, the storage unit 204 may store historical data, network configurations, security policies, and other relevant information necessary for optimizing the recommendation process and ensuring the effectiveness of the recommended actions. By centralizing this information in the storage unit 204, the system 102 is able to access and retrieve it efficiently, facilitating rapid decision-making and response to detect the one or more anomalies in the communication network 108. The storage unit 204 may be any kind of database such as, but not limited to, relational databases, dedicated databases, dynamic databases, monetized databases, scalable databases, cloud databases, distributed databases, any other databases, and a combination thereof.

In an exemplary embodiment, the flow aggregator subsystem 206 is configured to receive the network traffic data from the one or more network endpoints 116 for aggregating the network traffic data into network flow data. The one or more network endpoints 116 may be, but not limited to, the one or more communication devices 106, the one or more servers 110, and network routers, repeaters, firewall devices, network devices, the databases 104, network attached storage devices, assets, machinery, instruments, facility equipment, emergency management devices, image capturing devices, any other devices, and combination thereof. The primary function of the flow aggregator subsystem 206 is to aggregate or collect the network traffic data from these one or more network endpoints 116. The network traffic data refers to the information transmitted across the communication network 108, which includes various a plurality of data packets. The network traffic data comprises at least one of: layer-3 packets, layer-4 Transmission Control Protocol (TCP) flows, layer-4 User Datagram Protocol (UDP) flows, and layer-7 application-level payloads. The layer-3 packets are data packets at the network layer of the Open Systems Interconnection (OSI) model, containing source and destination IP addresses. The layer-4 TCP flows are TCP packets, which ensure reliable and ordered delivery of data. The layer-4 UDP flows are UPD packets, which provide a connectionless communication service. The layer-7 application-level payloads are packets containing application-specific data, such as Hypertext Transfer Protocol (HTTP) requests or Voice over Internet Protocol (VoIP) data.

Once the network traffic data is collected, it is organized into the network flow data, configured with the one or more attributes. The one or more attributes comprises, but not limited to, at least one of: source Internet Protocol (IP) addresses, destination Internet Protocol (IP) addresses, destination ports, transfer protocols, flow bytes, flow packets, and timestamps. The source IP addresses: The IP address of the sender or originator of the data packet. The destination IP addresses: the IP address of the intended recipient of the data packet. The destination ports are the port number at the destination endpoint where the data packet is intended to be received. The transfer protocols refer to the communication protocols used, such as TCP or UDP. The flow bytes refer to the total number of bytes in the data flow. The flow packets: the total number of packets in the data flow. The timestamps refer to the time at which the data packet was transmitted. The one or more attributes are stored in the database 104 for further analysis. By capturing a wide range of attributes, the system can perform comprehensive analysis and detection of the one or more anomalous network patterns.

In an exemplary embodiment, the flow feature generation subsystem 208 is responsible for processing the aggregated network traffic data and extracting meaningful features from it. The flow feature generation subsystem 208 operates on a packet-by-packet basis, meaning the flow feature generation subsystem 208 analyzes individual data packets within the aggregated network flow data. The flow feature generation subsystem 208 is configured with a rolling window-based analysis technique to extract the one or more flow features 216 from the network traffic data. This rolling window-based analysis involves dividing the network traffic data into fixed-length time intervals or windows, and then computing the one or more flow features 216 within each window. As new data points become available, the window "rolls" forward in time, and the analysis is repeated for each successive window. The size of the window determines the amount of data included in each analysis. A smaller window captures finer-grained details but may be susceptible to noise, while a larger window provides a more generalized view but may overlook transient patterns. Within each window, the one or more flow features 216 is computed from the network traffic data. The one or more flow features 216 capture important characteristics of the traffic, such as volume, frequency, duration, and distribution of each packet of the network traffic data. By using a rolling window, the flow feature generation subsystem 208 is configured to capture temporal patterns and fluctuations in the network traffic over time. The one or more flow features 216 for each packet associated with the aggregated network traffic data comprises, but not limited to, at least one of: source duration, source bytes, source packets, destination duration, destination bytes, and destination packets. The source duration represents the duration of the data flow from a source endpoint. The source bytes represents a total number of bytes transmitted from the source endpoint. The source packets represents a total number of packets transmitted from the source endpoint. The destination duration represents the duration of the data flow at a destination endpoint. The destination bytes represents the total number of bytes received at the destination endpoint. The destination packets represents the total number of packets received at the destination endpoint.

The flow feature generation subsystem 208 utilizes the time-series methods to process the one or more flow features 216. The time-series methods are configured to compute smoothed estimates of averages and variances for the one or more flow features 216 over predefined time windows. The predefined time windows ranges between 5 and 60 minutes time window. The time-series methods assign exponentially decreasing weights to older data points, giving more weight to recent observations. By smoothing the one or more flow features 216, the flow feature generation subsystem 208 reduces noise and fluctuations in the network traffic data, making it easier to identify meaningful one or more anomalous network patterns and the one or more anomalies. The flow feature generation subsystem 208 is configured to capture 1) volumetric statistical properties of all IPs 2) a two-time window amplifies the difference between a short and long-time window. The time-series methods comprises at least one of a: exponential-weighted smoothing, on-line cumulative distribution updating, and the like.

In an exemplary embodiment, the anomaly detection subsystem 210 also known as a deep learning module that utilizes the one or more deep-learning models to analyze the one or more flow features 216 extracted from the network traffic data. The primary objective of the anomaly detection subsystem 210 is to detect the one or more anomalous network patterns thereby assigning a first-stage numerical score to the one or more anomalies indicative of potential security threats or abnormal behavior. The one or more deep-learning models is well-suited for unsupervised learning tasks, such as detection of the one or more anomalies in the network traffic data, where labeled training data may be scarce or unavailable. The anomaly detection subsystem 210 includes an embedding layer. The embedding layer is responsible for segregating numerical state variables 218 and categorical flow labels 220 associated with the one or more flow features 216. By segregating the numerical state variables 218 and the categorical flow labels 220, the embedding layer enhances the communication network 108 ability to learn meaningful representations of the network traffic data. The first-stage numerical score is the raw score assigned to the one or more anomalies by the anomaly detection subsystem 210. The one or more deep-learning models is a multi-layer autoencoder neural network. The multi-layer autoencoder neural network comprises at least one of, but not limited to, convolutional network layer, gated recurrent units (GRUs), long short-term memories S (LSTMs), dropout, normalization, fully connected layer, and the like. The convolutional network layer applies convolutional filters to the network traffic data. The convolutional operations assist in capturing local patterns and structures in the network traffic data, such as specific sequences of packet sizes or inter-arrival times that may indicate normal or abnormal behaviors.

The GRUs are recurrent neural networks (RNNs) units that capture dependencies over time. The GRUs are configured to track the evolution of network traffic patterns over time, making it possible to detect deviations that may indicate the one or more anomalies. The LSTMs are another type of RNN that are adept at learning from sequences with long-term dependencies. The LSTMs use a complex gating mechanism to control the flow of network traffic data, which allows them to learn which information is important to keep or discard over long sequences. This aids in mitigating issues like vanishing or exploding gradients that are common in traditional RNNs. The LSTMs are configured to maintain context over longer sequences of the network traffic data, providing a robust way to model the temporal dynamics and detect the one or more anomalies that unfold over extended periods.

The dropout is a regularization technique used to prevent overfitting. During the offline training, the dropout randomly sets a fraction of the input units to zero at each update cycle, which prevents the network from becoming too reliant on any particular path through the network. The dropout is configured to ensure that the one or more deep-learning models generalize well to unseen the network traffic data, improving its ability to detect the one or more anomalies in real-world conditions. The normalization is a technique that ensure that the input network traffic data to the neural network layers are scaled appropriately. For the network traffic data, normalization ensures that all input features (e.g., packet sizes, durations, byte counts) are on a similar scale, which helps the neural network learn more effectively. The fully connected layer is configured to aggregate the one or more flow features learned by previous layers and perform at least one of: final classification tasks and regression tasks. The fully connected layer is configured to process the combined one or more flow features to determine the final anomaly score or classification, providing the first-stage numerical score that indicates the detection of the one or more anomalous network patterns.

The one or more deep-learning models utilizes leaky rectified linear units (Leaky-ReLU) as activation functions. The Leaky-ReLU is a type of activation function commonly used in neural networks. The leaky-ReLU is configured to perform at least one of an: encoding and decoding of the one or more flow features 216, to provide an optimal characteristic between at least one of: diverse traffic types, the numerical state variables 218, and the categorical flow labels 220. The Leaky-ReLU assists in mitigating the vanishing gradient problem and allows for the encoding and decoding of the one or more flow features 216 within the one or more deep-learning models. The anomaly detection subsystem 210 leverages simulated traffic data in combination with real-time network traffic data for offline training the one or more deep-learning models. By using a combination of simulated and real-world data, the network may learn to identify a wide range of one or more anomalous patterns and adapt to evolving threats. The neural network consists of four stacked layers of dense neurons. The Leaky-ReLU activation functions are applied to the neurons in each layer. These layers are divided into an encoding phase followed by a decoding phase. The numerical state variables 218 and the categorical flow labels 220 are constructed separately within the network. An optimization cost function used during training is a combination of Mean Squared Error (MSE) for the numerical part and Cross-Entropy Error for the categorical part. A tunable penalty parameter is introduced to balance the contributions of the numerical and categorical parts. This approach ensures that the network learns to minimize errors in both numerical state variables 218 and the categorical flow labels 220 predictions simultaneously. The one or more deep-learning models is trained using a combination of the real-time data and simulated traffic data. The diverse dataset allows the one or more deep-learning models to learn from various traffic patterns and adapt to different scenarios effectively. By training on a mixture of the real-time data and the simulated data, the network may generalize well to detect the one or more anomalies in unseen network traffic data.

In an exemplary embodiment, the dynamic score subsystem 212 is configured to convert the first-stage numerical score into a second-stage numerical score. The second-stage numerical score is known as a probability score. The dynamic score subsystem 212 is configured to receive the first-stage numerical score from the anomaly detection subsystem 210, the dynamic score subsystem 212 employs the time-series methods. The time-series methods comprise at least one of a: exponential-weighted smoothing, on-line cumulative distribution updating, and the like. The time-series methods utilize the dynamically altered threshold score, which is adjusted based on the cumulative distribution of the first-stage numerical score. By analyzing the distribution of scores over time, the dynamic score subsystem 212 generates the second-stage numerical score within the predefined range of 0 to 100. Therefore, a value of 99 indicates that the observed event (the given IP's state) falls into the 1% of the event category and hence may be considered as an anomaly to generate an outlier alert. The dynamic score subsystem 212 is configured to update the pre-defined range of the second-stage numerical score based on the first-stage numerical score and the frequency of detection of the one or more anomalies. The dynamic score subsystem 212 continuously monitors the first-stage numerical score and the frequency of detection of the one or more anomalies. Based on this monitoring, dynamic score subsystem 212 dynamically adjusts the predefined range of the second-stage numerical score. This adaptive approach ensures that a scoring mechanism remains effective and responsive to changes in network behavior and the one or more anomalous network patterns.

In an exemplary embodiment, the dynamic score subsystem 212 includes an alert-generating module. The alert-generating module is triggered if the second-stage numerical score exceeds the dynamically altered threshold score. Upon triggering, it generates the outlier alert, signaling the presence of the one or more anomalous network patterns. The inference process involves computing the MSE between the fitted feature vectors and original feature vectors for each IP address. These MSE values are then aggregated over time to form a rolling cumulative distribution. Based on this rolling cumulative distribution, the raw prediction is converted into a probability value ranging from 0 to 100. A higher probability value indicates a higher likelihood of an event being an outlier. This configurable threshold allows for fine-tuning the sensitivity of the anomaly detection system to suit specific network environments and requirements. The second-stage numerical score provides probabilistic meaning.

In an exemplary embodiment, the calibration subsystem 214 operates independently and continuously monitors and updates one or more system parameters based on one or more systemwide average metrics. The one or more system parameters comprises at least one of: the dynamically altered threshold score, weights, and biases of the one or more deep-learning models, and window sizes for the time-series methods. The calibration subsystem 214 is configured to trigger every 30 minutes, to measure the one or more systemwide average metrics over the preceding 30-minute window. The collected one or more systemwide average metrics is then utilized in the one or more aspects of the system 102 operation, particularly in the one or more flow features 216 construction to ensure consistent scaling of one or more transformed features for accurate estimation of the one or more anomalous network patterns. The one or more systemwide average metrics comprises at least one of, but not limited to, the source Internet Protocol (IP) addresses, the destination Internet Protocol (IP) addresses, total bytes, packets, flows, average network latency, throughput, error rates, and the like.

In an exemplary embodiment, the second-stage numerical score and the one or more flow features 216 are configured to store in an elasticsearch database 104a. The elasticsearch database 104a is configured with a data visualization dashboard 118 to provide various visualization tools, including at least one of: histograms, line charts, pie charts, and heat-maps, to visualize the second-stage numerical score and the one or more flow features 216. The data visualization dashboard 118 may be KIBANA dashboard.

Figure 3:
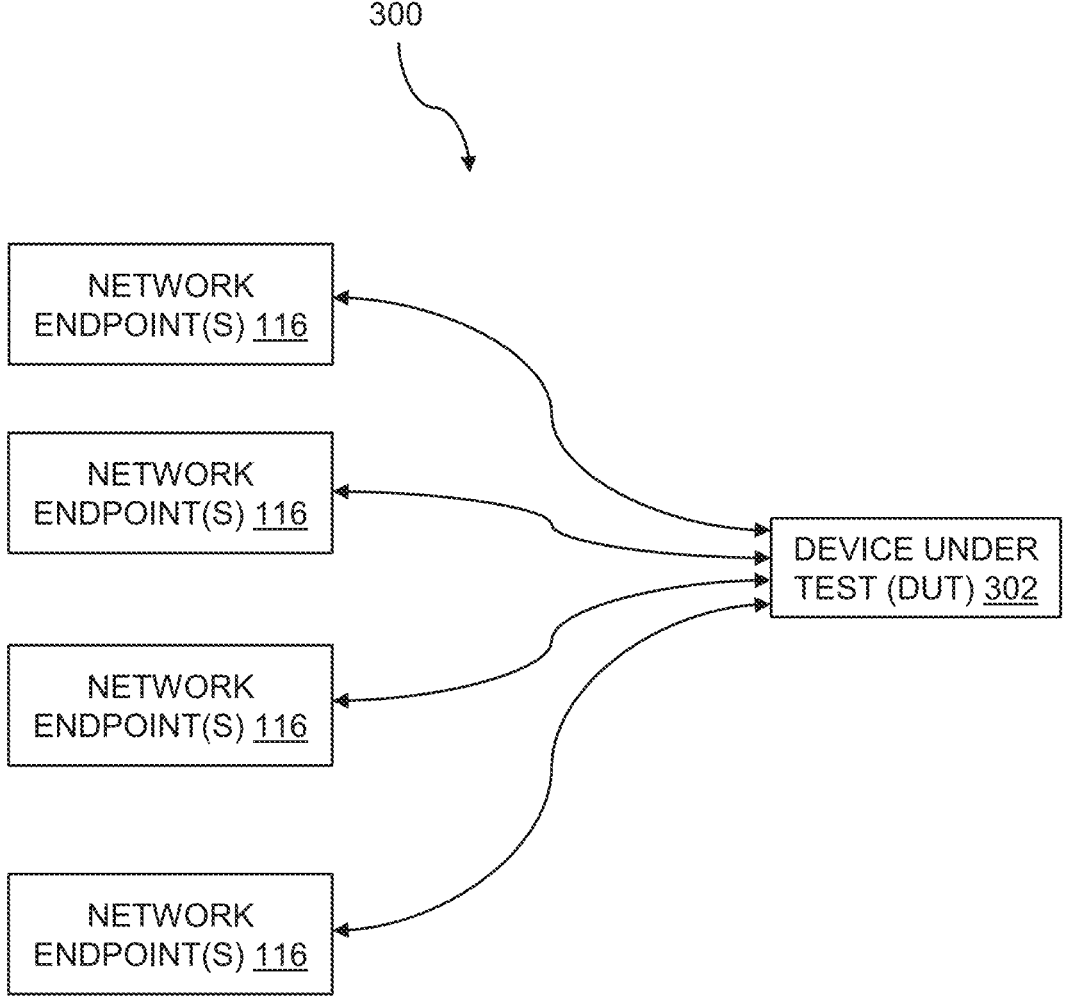
FIG. 3 illustrates an exemplary network deployment diagram of the computer-implemented system, in accordance with an embodiment of the present disclosure.

FIG. 3 illustrates an exemplary network deployment diagram 300 of the computer-implemented system 102, in accordance with an embodiment of the present disclosure.

According to FIG. 3, the system 102 is implemented as containerized services and deployed on a Device Under Test (DUT) module 302. The network traffic data comprising raw data are collected at one or more network endpoints 116 of the system 102. By associating network traffic data with the communication devices 106 or users, and incorporating the computed numerical scores into behavioral analysis, the system 102 enables a granular understanding of users entities behavior on the network. The system 102 facilitates targeted monitoring, detection, and response to the one or more anomalous network patterns, enhancing network security and enabling effective management of the one or more communication devices 106 or users within the network environment.

FIG. 4 illustrates an exemplary flow chart of a computer-implemented method 400 for detecting the one or more anomalous network patterns based on analyzing the network traffic data, in accordance with an embodiment of the present disclosure.

According to an exemplary embodiment of the present disclosure, the computer-implemented method 400 is disclosed. At step 402, the computer-implemented method 400 includes aggregating, by the one or more servers, the network traffic data received from the one or more network endpoints into the network flow data. The network flow data is configured with the one or more attributes. The network traffic data comprises at least one of, but not limited to, the layer-3 packets, layer-4 TCP/UDP flows, layer-7 application-level payloads and the like. The one or more attributes comprises at least one of the, but not limited to, source Internet Protocol (IP) addresses, destination Internet Protocol (IP) addresses, destination ports, transfer protocols, flow bytes, flow packets, timestamps, and the like.

At step 404, the computer-implemented method 400 includes generating, by the one or more servers, the one or more flow features for each packet associated with the aggregated network traffic data based on the rolling window-based analysis of the one or more attributes. The one or more flow features comprises at least one of: source duration, source bytes, source packets, destination duration, destination bytes, and destination packets.

At step 406, the computer-implemented method 400 includes analyzing, by the one or more servers, the one or more flow features by utilizing the one or more deep-learning models to detect the one or more anomalous network patterns of the one or more anomalies in the network traffic data to assign the first-stage numerical score to the one or more anomalies. The one or more deep-learning models is configured to utilize the simulated traffic data in combination with the real-time network traffic data, for offline training. The one or more deep-learning models is the multi-layer autoencoder neural network. The one or more flow features are encoded and then decoded by the leaky-ReLU to provide an optimal characteristic between at least one of: diverse traffic types, the numerical state variables, and the categorical flow labels.

At step 408, the computer-implemented method 400 includes converting, by the one or more servers, the first-stage numerical score into the second-stage numerical score within the pre-defined range using the time-series methods based on the dynamically altered threshold score using the cumulative distribution of the first-stage numerical score to detect the one or more anomalous network patterns derived from the analysis of network traffic data. Upon generating the second-stage numerical score the alert-generating module triggers if the second-stage numerical score exceeds the dynamically altered threshold score. Upon triggering, the alert-generating module generates the outlier alert, signaling the presence of the one or more anomalous network patterns.

Further, in the next step, the computer-implemented method 400 includes visualizing, by the one or more servers, through the data visualization dashboard the second-stage numerical score, and the one or more flow features stored in the elasticsearch database. In the next step, the computer-implemented method 400 includes updating, by the one or more servers, the one or more system parameters based on the one or more systemwide average metrics.

Figure 5:
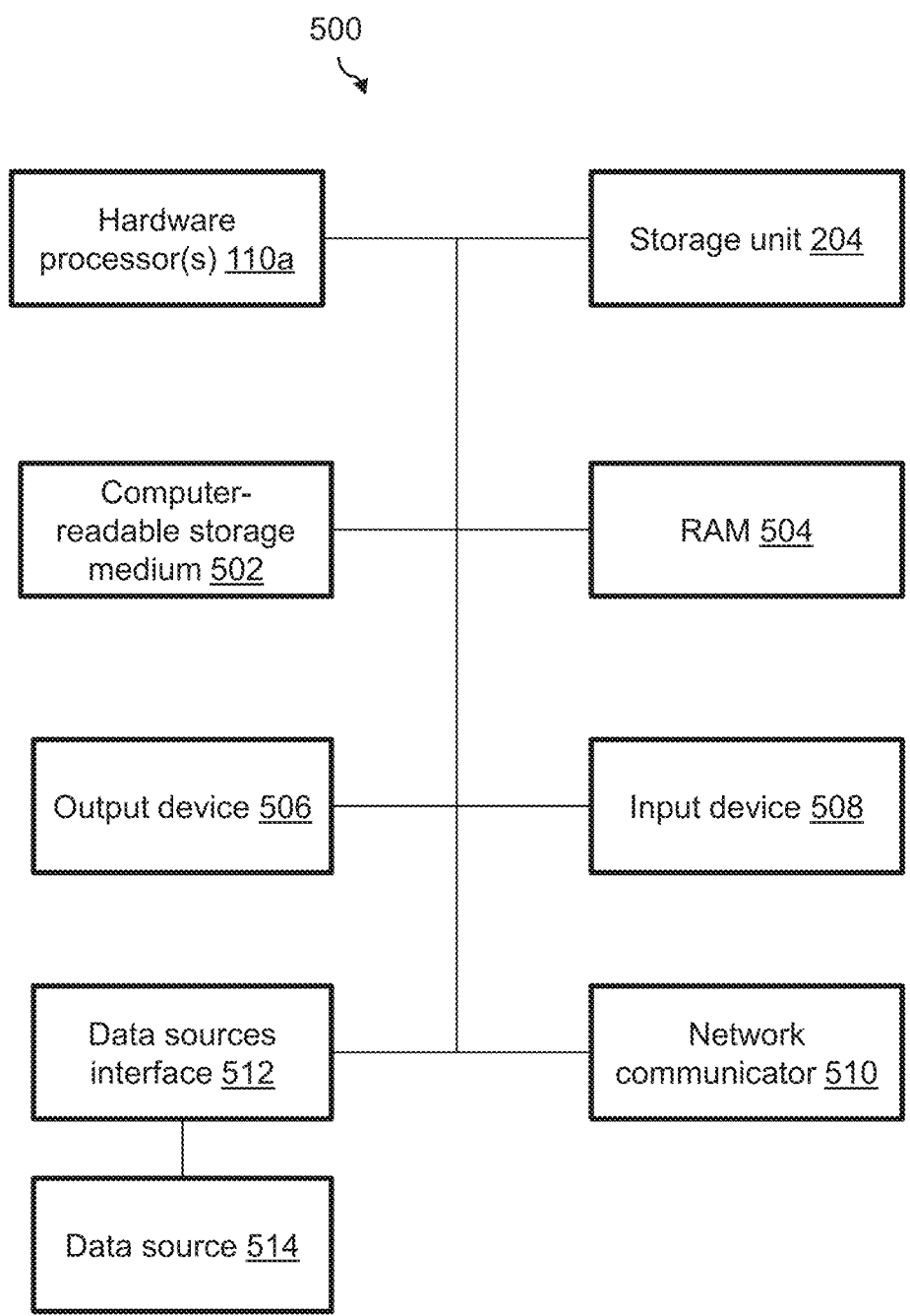
FIG. 5 illustrates an exemplary block diagram representation of a server platform for implementation of the disclosed computer-implemented system, according to an example embodiment of the present disclosure.

FIG. 5 illustrates an exemplary block diagram representation of a server platform 500 for implementation of the disclosed system 102, according to an example embodiment of the present disclosure.

In an exemplary embodiment, for the sake of brevity, the construction, and operational features of the system 102 which are explained in detail above are not explained in detail herein. Particularly, computing machines such as but not limited to internal/external server clusters, quantum computers, desktops, laptops, smartphones, tablets, and wearables may be used to execute the system 102 or may include the structure of the server platform 500. As illustrated, the server platform 500 may include additional components not shown, and some of the components described may be removed and/or modified. For example, a computer system with multiple graphics processing units (GPUs) may be located on at least one of: internal printed circuit boards (PCBs) and external-cloud platforms including Amazon Web Services, internal corporate cloud computing clusters, or organizational computing resources.

The server platform 500 may be a computer system such as the system 102 that may be used with the embodiments described herein. The computer system may represent a computational platform that includes components that may be in one or more servers 110 or another computer system. The computer system may be executed by the one or more hardware processors 110a (e.g., single, or multiple processors) or other hardware processing circuits, the methods, functions, and other processes described herein. These methods, functions, and other processes may be embodied as machine-readable instructions stored on a computer-readable medium, which may be non-transitory, such as hardware storage devices (e.g., RAM (random access memory), ROM (read-only memory), EPROM (erasable, programmable ROM), EEPROM (electrically erasable, programmable ROM), hard drives, and flash memory). The computer system may include the one or more hardware processors 110a that execute software instructions or code stored on a non-transitory computer-readable storage medium 502 to perform methods of the present disclosure. The software code includes, for example, instructions to gather data and analyze the data. For example, the plurality of subsystems 114 includes the flow aggregator subsystem 206, the flow feature generation subsystem 208, the anomaly detection subsystem 210, the dynamic score subsystem 212, and the calibration subsystem 214.

The instructions on the computer-readable storage medium 502 are read and stored the instructions in the storage unit 204 or random-access memory (RAM) 504. The storage unit 204 may provide a space for keeping static data where at least some instructions could be stored for later execution. The stored instructions may be further compiled to generate other representations of the instructions and dynamically stored in the RAM 504. The one or more hardware processors 110a may read instructions from the RAM 504 and perform actions as instructed.

The computer system may further include the output device 506 to provide at least some of the results of the execution as output including, but not limited to, visual information to users, such as external agents. The output device 506 may include a display on computing devices and virtual reality glasses. For example, the display may be a mobile phone screen or a laptop screen. GUIs and/or text may be presented as an output on the display screen. The computer system may further include an input device 508 to provide a user or another device with mechanisms for entering data and/or otherwise interacting with the computer system. The input device 508 may include, for example, a keyboard, a keypad, a mouse, or a touchscreen. Each of these output devices 506 and input device 508 may be joined by one or more additional peripherals.

A network communicator 510 may be provided to connect the computer system to a network and in turn to other devices connected to the network including other entities, servers, data stores, and interfaces. The network communicator 510 may include, for example, a network adapter such as a LAN adapter or a wireless adapter. The computer system may include a data sources interface 512 to access the data source 514. The data source 514 may be an information resource. As an example, a database of exceptions and rules may be provided as the data source 514. Moreover, knowledge repositories and curated data may be other examples of the data source 514. The data source 514 may include libraries containing, but not limited to, tensorflow, pytorch, numpy and the like.

Numerous advantages of the present disclosure may be apparent from the discussion above. In accordance with the present disclosure, the system for detecting the one or more anomalous network patterns is based on analyzing the network traffic data. The system is able to capture and represent complex network behaviors effectively. The utilization of the one or more deep-learning models allows for the detection of subtle anomalies in the network traffic data, providing enhanced accuracy in identifying potential security threats or abnormal activities. The dynamic scoring subsystem enhances the detection process by converting raw numerical scores into probability scores, enabling the system to adaptively adjust detection thresholds based on the real-time network conditions and performance metrics. Optimized and efficient design and implementation of neural network architecture on the edge with no special hardware requirements, applicable to commercial x86 or arm-based hardware architectures. The generation of the one or more flow features that carry time-dependent state information as well as combining both numerical and categorical features that are tailored to network flow traffic data in the neural network architecture. The system with complete self-updatable process flow that allows the system to be dynamically updated and adaptable to the changing network conditions. The system versatility enables it to function in multiple capacities: Firstly, the system operates autonomously as an independent service, dedicated to monitoring abnormal traffic behavior associated with IP addresses. This capability allows the system to continuously analyze network activity and promptly identify any deviations from expected patterns, thereby enhancing network security and threat detection. Secondly, the system seamlessly integrates with at least one of: Endpoint Detection and Response (EDR) systems and Security Information and Event Management (SSE) systems. By feeding generated alerts into the log collection system, the system enhances the overall security posture by providing valuable insights into potential security incidents. These alerts serve as valuable inputs for further analysis and detection of malicious activities, enabling organizations to respond swiftly and effectively to security threats.

A description of an embodiment with several components in communication with each other does not imply that all such components are required. On the contrary, a variety of optional components are described to illustrate the wide variety of possible embodiments of the invention. When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article, or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open-ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

What is claimed is:

1. A computer-implemented system for detecting one or more anomalous network patterns based on analyzing network traffic data, comprising:
  one or more servers configured with one or more hardware processors;
  a memory unit coupled to the one or more servers, wherein the memory unit comprises a set of program instructions in form of a plurality of subsystems, configured to be executed by the one or more servers, wherein the plurality of subsystems comprises:
    a flow aggregator subsystem configured to receive the network traffic data from one or more network endpoints for aggregating the network traffic data into network flow data,
      the network flow data configured with one or more attributes;
    a flow feature generation subsystem configured to generate one or more flow features for each packet associated with the aggregated network traffic data based on a rolling window-based analysis of the one or more attributes;
    an anomaly detection subsystem configured to analyze the one or more flow features by utilizing one or more deep-learning models to detect the one or more anomalous network patterns of one or more anomalies in the network traffic data thereby assigning a first-stage numerical score to the one or more anomalies; and
    a dynamic score subsystem configured to convert the first-stage numerical score into a second-stage numerical score within a pre-defined range using time-series methods based on a dynamically altered threshold score using a cumulative distribution of the first-stage numerical score to detect the one or more anomalous network patterns derived from the analysis of network traffic data,
  wherein the flow feature generation subsystem configured with time-series methods, and
    the time-series methods are configured to compute smoothed estimates of averages and variances for the one or more flow features over pre-defined time windows, and
    the time-series methods comprise at least one of: exponential-weighted smoothing, and on-line cumulative distribution updating, and wherein
    the dynamic score subsystem is configured with an alert-generating module, and
    the alert-generating module is configured to generate an outlier alert if the second-stage numerical score exceeds the dynamically altered threshold score, indicating a presence of the one or more anomalous network patterns.

2. The computer-implemented system of claim 1, wherein the network traffic data comprises at least one of: layer-3 packets, layer-4 Transmission Control Protocol (TCP) flows, layer-4 User Datagram Protocol (UDP) flows, and layer-7 application-level payloads.

3. The computer-implemented system of claim 1, wherein the one or more attributes comprises at least one of: source Internet Protocol (IP) addresses, destination Internet Protocol (IP) addresses, destination ports, transfer protocols, flow bytes, flow packets, and timestamps.

4. The computer-implemented system of claim 1, wherein the one or more flow features comprises at least one of: source duration, source bytes, source packets, destination duration, destination bytes, and destination packets.

5. The computer-implemented system of claim 1, wherein the anomaly detection subsystem procedures configured with an embedding layer,
  the embedding layer is configured to segregate numerical state variables and categorical flow labels associated with the one or more flow features.

6. The computer-implemented system of claim 1, wherein one or more deep-learning models is configured with a Leaky Rectified Linear Unit (leaky-ReLU),
  the Leaky Rectified Linear Unit (leaky-ReLU) configured to perform at least one of an: encoding and decoding of the one or more flow features, to provide an optimal characteristic between at least one of: diverse traffic types, the numerical state variables, and the categorical flow labels to detect the one or more anomalous network patterns.

7. The computer-implemented system of claim 1, wherein the anomalies detection subsystem is configured to utilize simulated traffic data in combination with real-time network traffic data, for offline training the one or more deep-learning models,
  the one or more deep-learning models is a multi-layer autoencoder neural network.

8. The computer-implemented system of claim 1, wherein the pre-defined range for the second-stage numerical score generated by the dynamic score subsystem is configured between 0 and 100, the dynamic score subsystem is configured to update the pre-defined range of the second-stage numerical score based on the first-stage numerical score and a frequency of detection of the one or more anomalies.

9. The computer-implemented system of claim 1, wherein the plurality of subsystems comprises a calibration subsystem, the calibration subsystem is configured to continuously monitor and update one or more system parameters based on one or more systemwide average metrics, the one or more system parameters comprises at least one of: the dynamically altered threshold score, weights, and biases of the one or more deep-learning models, and window sizes for the time-series methods; and the one or more systemwide average metrics comprises at least one of: the source Internet Protocol (IP) addresses, the destination Internet Protocol (IP) addresses, total bytes, packets, flows, average network latency, throughput, and error rates.

10. The computer-implemented system of claim 1, wherein the second-stage numerical score and the one or more flow features are configured to store in an elasticsearch database, the elasticsearch database is configured with a data visualization dashboard to provide various visualization tools, including at least one of: histograms, line charts, pie charts, and heatmaps to visualize the second-stage numerical score and the one or more flow features.

11. A computer-implemented method for detecting one or more anomalous network patterns based on analyzing network traffic data, comprising:

aggregating, by one or more servers, the network traffic data received from one or more network endpoints into network flow data, the network flow data configured with one or more attributes;

generating, by the one or more servers, one or more flow features for each packet associated with the aggregated network traffic data based on a rolling window-based analysis of the one or more attributes;

analyzing, by the one or more servers, the one or more flow features by utilizing one or more deep-learning models to detect the one or more anomalous network patterns of one or more anomalies in the network traffic data to assign a first-stage numerical score to the one or more anomalies; and converting, by the one or more servers, the first-stage numerical score into a second-stage numerical score within a pre-defined range using time-series methods based on a dynamically altered threshold score using a cumulative distribution of the first-stage numerical score to detect the one or more anomalous network patterns derived from the analysis of network traffic data wherein generating the one or more flow features are configured with time-series methods, and the time-series methods are configured to compute smoothed estimates of averages and variances for the one or more flow features over pre-defined time windows, and the time-series methods comprise at least one of: exponential-weighted smoothing, and on-line cumulative distribution updating, and wherein the one or more servers are configured with an alert-generating module, and the alert-generating module is configured to generate an outlier alert if the second-stage numerical score exceeds the dynamically altered threshold score, indicating a presence of the one or more anomalous network patterns.

12. The computer-implemented method of claim 11, comprising:

visualizing, by the one or more servers, through a data visualization dashboard the second-stage numerical score, and the one or more flow features stored in an elasticsearch database.

13. The computer-implemented method of claim 11, comprising:

updating, by the one or more servers, one or more system parameters based on one or more systemwide average metrics;

the one or more system parameters comprises at least one of: the dynamically altered threshold score, weights, and biases of the one or more deep-learning models procedures, and window sizes for time-series methods; and the one or more systemwide average metrics comprises at least one of: source Internet Protocol (IP) addresses, destination Internet Protocol (IP) addresses, total bytes, packets, flows, average network latency, throughput, and error rates.

14. The computer-implemented method of claim 11, wherein the network traffic data comprises at least one of: layer-3 packets, layer-4 TCP/UDP flows, and layer-7 application-level payloads.

15. The computer-implemented method of claim 11, wherein the one or more attributes comprises at least one of: source Internet Protocol (IP) addresses, destination Internet Protocol (IP) addresses, destination ports, transfer protocols, flow bytes, flow packets, and timestamps.

16. The computer-implemented method of claim 11, wherein the one or more flow features comprises at least one of: source duration, source bytes, source packets, destination duration, destination bytes, and destination packets.

17. The computer-implemented method of claim 11, wherein the pre-defined range for the second-stage numerical score generated by the dynamic score subsystem is configured between 0 and 100, and the dynamic score subsystem is configured to update the pre-defined range of the second-stage numerical score based on the first-stage numerical score and a frequency of detection of the one or more anomalies.

18. A non-transitory computer-readable storage medium having programmable instructions stored therein, that when executed by one or more servers, cause the one or more servers to:

aggregating network traffic data received from one or more network endpoints into network flow data, the network flow data configured with one or more attributes;

generating one or more flow features for each packet associated with the aggregated network traffic data based on a rolling window-based analysis of the one or more attributes;

analyzing the one or more flow features by utilizing one or more deep-learning models to detect the one or more anomalous network patterns of one or more anomalies in the network traffic data to assign a first-stage numeri-
cal score to the one or more anomalies; and converting the first-stage numerical score into a second-
stage numerical score within a pre-defined range using
time-series methods based on a dynamically altered
threshold score using a cumulative distribution of the
first-stage numerical score to detect the one or more
anomalous network patterns derived from the analysis
of network traffic data, wherein generating the one or more flow features are configured with time-series methods, and the time-series methods are configured to compute
smoothed estimates of averages and variances for the
one or more flow features over pre-defined time win-
dows, and the time-series methods comprise at least one of: expo-
nential-weighted smoothing, and on-line cumulative
distribution updating, and wherein the one or more servers are configured with an alert-
generating module, and the alert-generating module is configured to generate an
outlier alert if the second-stage numerical score
exceeds the dynamically altered threshold score, indi-
cating a presence of the one or more anomalous net-
work patterns.

\* \* \* \* \*